Sept. 25, 1934.    L. V. LUCIA    1,974,923
THERMAL FUSE
Filed Aug. 14, 1930
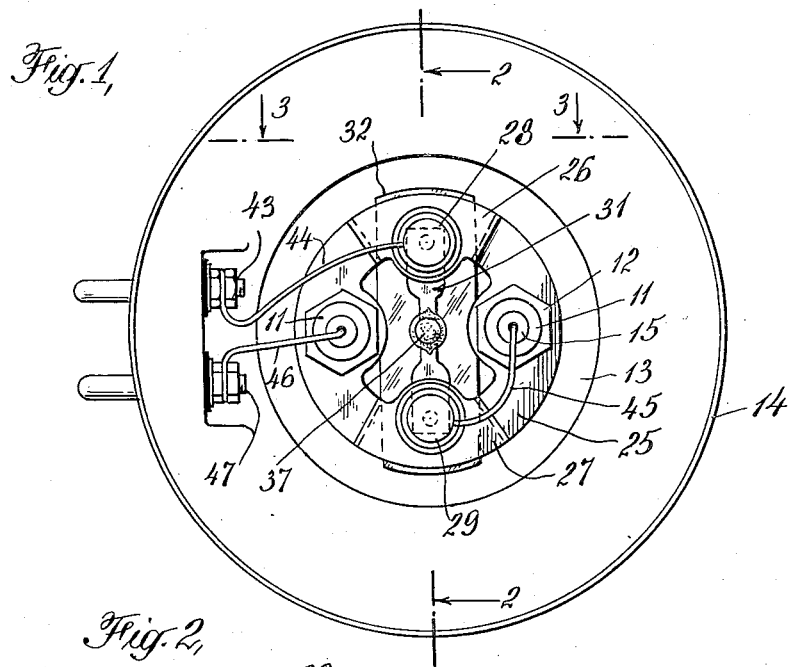
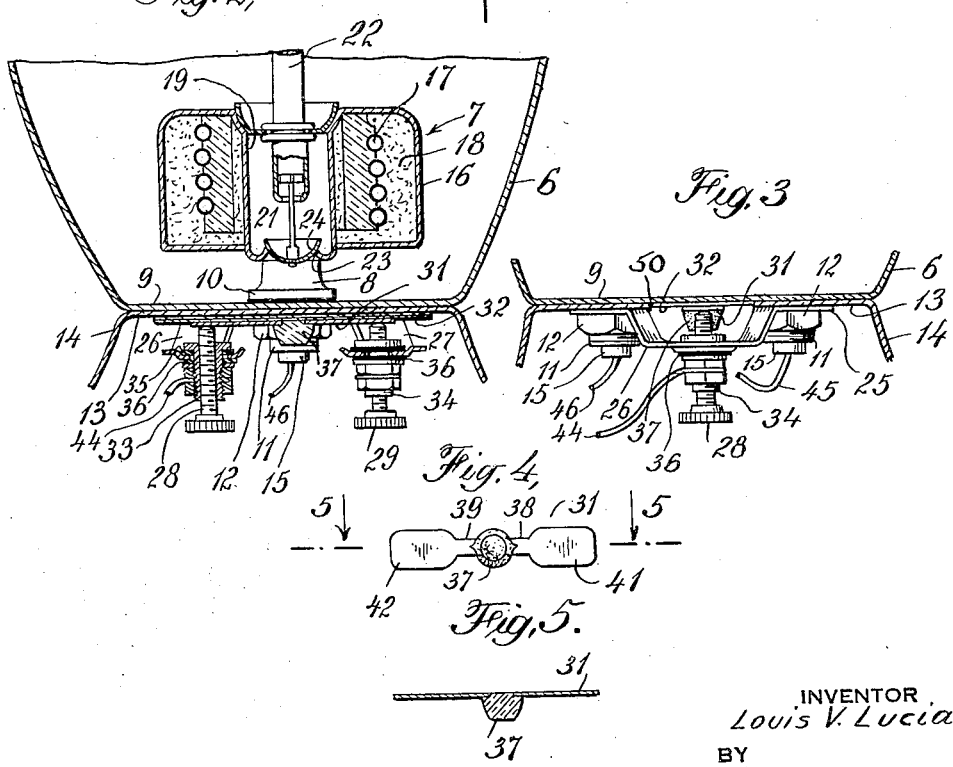
INVENTOR
Louis V. Lucia
BY
Pennie, Davis, Marvin & Edmonds
ATTORNEYS Patented Sept. 25, 1934

1,974,923

UNITED STATES PATENT OFFICE 1,974,923

THERMAL FUSE

Louis V. Lucia, Rome, N. Y., assignor to Revere Copper and Brass Incorporated, a corporation of Maryland Application August 14, 1930, Serial No. 475,273

3 Claims. (Cl. 219—44)

This invention relates to heated utensils, and more particularly to means for cutting off the electric current in electrically heated utensils, such as percolators and the like, when the temperature thereof attains a predetermined degree.

In the operation of electric percolators and like utensils there is an element of considerable potential damage to the utensil unless provision is made to guard against destructive overheating, resulting from inadvertently permitting all of the water to boil off or from other exigencies.

To protect the utensil from such damage, it has been suggested heretofore that a thermal fuse be provided which would automatically melt at a predetermined temperature and break the electric circuit.

The embodiments which such protection has taken in the prior practice however, which has consisted in applying the thermal fuse directly to a heating unit located beneath the percolator, fail to provide the certainty and efficiency of operation and security from possible damage which is desired.

It is the object of my invention to provide an improved fuse construction and arrangement which is certain and highly efficient in operation, and which assures very adequate protection of the percolator or similar utensil against damage from detrimental overheating.

The manner in which I accomplish the same will be best understood from the following description, taken in conjunction with the accompanying drawing in which Fig. 1 is a plan view of the bottom of a percolator construction embodying the fuse arrangement of my invention;

Fig. 2 is a vertical section of the same taken along line 2—2 of Fig. 1;

Fig. 3 is a similar section of the bottom portion of the percolator taken along line 3—3 of Fig. 1;

Fig. 4 is a plan view of a fuse per se; and

Fig. 5 is a vertical section of the same taken along line 5—5 of Fig. 4.

Referring to the drawing and in particular to Fig. 1, reference numeral 6 designates a percolator body constituting a receptacle for the liquid to be heated, within which receptacle is disposed a suitable electric heating unit 7, carried by a pair of diametrically opposite, hollow posts 8 slightly above but in proximity to the bottom 9 of the receptacle 6.

The posts 8 are provided with shoulders 10 engaging the bottom 9 of the receptacle, and the projecting end portions 11 of the posts are threaded to receive nuts 12, which abut the bottom of the mounting plate 13 of the base structure 14. The hollow interior of the posts is provided for the reception of insulating sleeves 15 which carry the heating-unit lead wires.

The aforenoted arrangement for detachably securing the heating unit can be simultaneously relied upon as the principal means of securement of the percolator body to the base structure, if desired. It may, however, be relied upon simply for detachable attachment of the heating unit, and solder used to permanently secure the body to the base.

The internal heating unit 7 comprises an annular casing 16 containing a wire-wound resistor heating element 17, secured within the casing in close proximity to the wall thereof, either by imbedding it in cement 18, or securing it in any other suitable fashion.

The inner face 19 of the casing 16 defines a cylindrical well 21 in which successive small portions of liquid from the receptacle 6 are rapidly heated. A percolator tube 22 is provided in the top closure of said well, for the discharge of heated liquid therefrom, and an inlet 23 and cooperating valve 24 control the inflow of liquid to the well.

A ring plate 25 having a pair of diametrically opposite channel brackets 26 and 27, respectively, is secured between the nuts 12 and the bottom of the mounting plate 13. This ring plate supports a pair of clamping screws 28 and 29 which clamp the opposite ends of a fuse member 31.

As shown in Figs. 1 and 2, this fuse member is disposed directly against and diametrically across the bottom of the mounting plate 13, with the sole interposition of a strip 32 of mica or other suitable material of high electric but low heat-insulating properties.

The fuse clamping screws 28 and 29 are respectively threaded through sleeves 33 and 34 mounted in the channel brackets 26 and 27, respectively, and each sleeve is insulated from its respective bracket by means of a pair of mica washers 35 and 36, one interposed at the upper face of the bracket and the other at the lower.

As best shown in Figs. 4 and 5, the fuse 31 comprises a medial knob 37 composed of a material having a low melting point and suitable conductivity, which is interposed between and molded upon or otherwise attached to the reduced end portions 38 and 39 of contact strips 41—42, which may be constructed of any suitable material, for example, copper or brass, providing satisfactory conductivity of heat and electricity.

The enlarged terminal portions of the contact strips which are engaged by the fuse clamping screws 28 and 29, may be of the nature shown in Fig. 4, or, in the event a threaded binding post and cooperating thumb screw arrangement should be used to clamp the fuse and conduct the current thereto, these end portions may be forked to accommodate the binding posts.

The electric current for the operation of the heating unit 7 is led in at the terminal pin 43 (Fig. 1), passes through the lead wire 44 to the sleeve 33; thence through the screw 28, contact strip 41, fusible knob 37, contact strip 42, screw 29 and sleeve 34 to the lead wire 45; then through the coils in the resistor heating element 17 and finally through the lead wire 46 to the terminal pin 47.

By the use of the construction and arrangement just described, a very material improvement is secured in the operating efficiency and certainty of protection against detrimental overheating, as compared with the use of the constructions and arrangements heretofore suggested.

The location of the fuse member in close proximity to the parts it is sought to protect, in the case illustrated, the percolator bottom, positively assures highly effective protection where it is most desired. Furthermore, by locating the heating unit upon one side of the percolator wall and the fuse member on the other, it is positively assured that the actual temperature prevailing in the part of the utensil to be protected, will directly and accurately control the operation of the fuse.

These distinctly advantageous features are not provided by the constructions and arrangements of the prior art, wherein the fuse is applied to and controlled by the temperature of a heating unit which is located beneath the percolator body and separates the fuse a considerable distance therefrom. In such an arrangement, the temperature of the percolator body which it is desired to protect, must be assumed to be indicated by the temperature of the heating unit interposed between the body and the fuse, a very uncertain criterion upon which to base any sound security against damage to the percolator.

Furthermore, the application of the fuse directly to the source of heat, the point of highest temperature, necessitates the use of fusible material having a much higher melting point, than would be necessary if the fuse were applied to the body being heated, a point of lower temperature. Where such high melting fuse arrangement is to be utilized, moreover, for percolators wherein the body is soldered to the base as is frequently done, the necessity for an elevated melting point is carried over to the solder with even greater amplification; for then a solder must be used whose melting point provides such a material margin above that of the fuse, that there would be little possibility of the soldered juncture of the percolator body with the base being destroyed before the protective fuse operates.

By the direct control of the fuse operation by the temperature of the percolator bottom as in the arrangement of my invention on the other hand, in which the fuse is applied to and closely controlled by the temperature of the percolator bottom, a low melting fuse is all that is necessary; and a proportionately lower melting solder can be used in conjunction therewith, with obvious facilitation of the construction and assembly of the utensil. Moreover, the location of the fuse in such close proximity to the soldered juncture of the percolator body and the base, with the resultant close and accurate control, permits a substantial reduction in the wide differential usually required between the melting points of the fuse and the solder, which wide differential is necessary when the distantly removed fuse of the prior art is utilized, in order to provide a proper margin of safety.

In order to enhance the intimacy of contact between the fuse member and the bottom of the receptacle, or the intervening layer of solder if such is used, the mounting plate 13 may if desired be apertured, as embodied at 50 in Fig. 3, so that the fuse member may contact with the percolator bottom or the solder as the case may be, without the intermedium of the mounting plate, the usual insulating strip 32, however, being interposed therebetween. The aperture 50 in the mounting plate, is preferably cut out in the shape of the mica strip to serve to locate the same.

The particular melting point of a fuse embodied in accordance with my invention need only be slightly greater than the boiling temperature of the water in the percolator, and I have found that a temperature of approximately 300° C., for example, provides a very safe margin against all contingencies as regards the normal operation of the percolator, with the assurance of prompt circuit-breaking before detrimental overheating can take place.

While I have disclosed a preferred embodiment of my invention, various changes and modifications may be made therein if desired. The fuse member, for example, which should be disposed in close proximity to the percolator bottom, may be located on the same side of the bottom as the heating unit, either with both of these members inside of the receptacle or with both outside, provision being made where necessary for making the parts in contact with the water suitably watertight. The particular fuse-supporting means, electrical connections and the like, also may have other suitable arrangements substituted therefor. Certain features of the apparatus herein disclosed are the subject of Patents #1,916,228 and #1,922,546.

These and various other changes may be made in the embodiment disclosed without departing from the spirit of my invention, which is not to be considered as limited to said embodiment other than as comprehended by the following claims.

I claim as my invention:—

1. A heated utensil which comprises, a body portion comprising a receptacle for the material to be treated, an electric heating unit for heating said material, a fuse member disposed in heat-absorbing contact with the bottom of said receptacle and insulated therefrom, electrically conductive means at either end of said fuse member for supporting it in said contact, said heating unit, fuse member and fuse supporting members constituting parts of the same electric circuit, and means for supplying electricity to said circuit, said fuse member having a fusible portion adapted to melt and break said circuit when the temperature of said bottom reaches a predetermined degree.

2. A heated utensil which comprises, a body portion comprising a receptacle for the material to be treated, a base having a mounting plate upon which said body is mounted, means for connecting said body with said base, a fuse member disposed in heat-absorbing contact to the bottom of said mounting plate, a strip of electrically insulating heat-conducting material interposed between said plate and said fuse member, a supporting plate secured to the underside of said mounting plate, means for electrically insulating said supporting plate from said fuse member, members mounted upon said supporting plate and adapted to serve as leads for an electric current passed through said fuse member, and an electric heating unit for heating the material within said receptacle and adapted to constitute part of the electric circuit including said fuse member, said fuse member being adapted to melt and break said circuit to cut off the supply of heat from said heating unit when the temperature of said body portion reaches a predetermined degree.

3. In a heated utensil, the combination which comprises a body portion comprising a receptacle for the material to be heated, a mounting plate upon which said body portion is mounted, said mounting plate having an aperture, means for connecting said body portion to said mounting plate, and a fuse member disposed within said aperture of said mounting plate in heat-absorbing contact to the bottom of said body portion, and electrically insulating heat-conducting means disposed between said fuse member and said bottom.

LOUIS V. LUCIA.